United States Patent
Liu et al.

(10) Patent No.: US 9,460,750 B1
(45) Date of Patent: Oct. 4, 2016

(54) COMBINING SELECTED DATA FROM TWO OR MORE PASSES TO RECOVER A DATA SECTOR

(71) Applicant: Seagate Technology LLC, Cupertino, CA (US)

(72) Inventors: Xiong Liu, Singapore (SG); Myint Ngwe, Singapore (SG); Choon Wei Ng, Singapore (SG); Jian Qiang, Singapore (SG); Quan Li, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/865,113

(22) Filed: Sep. 25, 2015

(51) Int. Cl.
*G11B 27/36* (2006.01)
*G11B 5/09* (2006.01)
*G11B 20/12* (2006.01)
*G11B 5/02* (2006.01)

(52) U.S. Cl.
CPC .............. *G11B 20/1217* (2013.01); *G11B 5/02* (2013.01); *G11B 2020/1232* (2013.01)

(58) Field of Classification Search
CPC .......... G11B 5/012; G11B 27/36; G11B 5/02; G11B 2220/20; G11B 5/09
USPC .................................. 360/25, 31, 39, 48, 53
See application file for complete search history.

(56) References Cited

U.S. PATENT DOCUMENTS

| | | | |
|---|---|---|---|
| 5,600,505 A | 2/1997 | Ayres | |
| 6,487,146 B1 | 11/2002 | Verboom | |
| 7,602,575 B1 | 10/2009 | Lifchits et al. | |
| 8,849,784 B2 * | 9/2014 | Alber | 369/53.41 |

* cited by examiner

*Primary Examiner* — Nabil Hindi
(74) *Attorney, Agent, or Firm* — Hollingsworth Davis, LLC

(57) ABSTRACT

A data sector is read using two or more passes of a read head over a recording medium. Each of the passes corresponds to a different cross-track offset, each of the data sectors being divided into two or more blocks. For each of the blocks, data is selected from one of the passes that read the block with a higher quality than other passes that read the block. The selected data from each of the blocks to is combined to form recovered data of the data sector.

20 Claims, 7 Drawing Sheets

| Read No. w/offset | 1st | 2nd | 3rd | 4th | 5th | 6th | 7th | 8th |
|---|---|---|---|---|---|---|---|---|
| | Offset (% of track pitch) | | | | | | | |
| Block | 0% | 3% | 6% | -3% | -6% | -9% | -12% | -15% |
| 8 | 1st | 1st | 1st | 4th | 5th | 6th | 7th | 7th |
| 7 | 1st | 1st | 1st | 4th | 5th | 6th | 6th | 6th |
| 6 | 1st | 1st | 1st | 4th | 5th | 5th | 5th | 5th |
| 5 | 1st | 1st | 1st | 4th | 4th | 4th | 4th | 4th |
| 4 | 1st | 1st | 1st | 1st | 1st | 1st | 1st | 1st |
| 3 | 1st | 1st | 1st | 1st | 1st | 1st | 1st | 1st |
| 2 | 1st | 2nd | 2nd | 2nd | 2nd | 2nd | 2nd | 2nd |
| 1 | 1st | 2nd | 2nd | 2nd | 2nd | 2nd | 2nd | 2nd |

COMBINING SELECTED DATA FROM TWO OR MORE PASSES TO RECOVER A DATA SECTOR

SUMMARY

The present disclosure is directed to a combining selected data from two or more passes to recover a data sector. In one embodiment, a data sector is read using two or more passes of a read head over a recording medium. Each of the passes corresponds to a different cross-track offset, each of the data sectors being divided into two or more blocks. For each of the blocks, data is selected from one of the passes that read the block with a higher quality than other passes that read the block. The selected data from each of the blocks to is combined to form recovered data of the data sector.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices such as hard disk drives (HDDs). Generally, such devices include a magnetic read-write head that is held close to a recording medium such as a spinning magnetic disk. The read/write head is aligned over tracks of the recording medium through the use of prewritten servo marks. A read transducer of the read/write head reads data of the servo marks as they pass underneath the transducer, and data encoded in the servo marks allows the servo control system to determine where on the disk surface the read/write head is located, e.g., as a function of rotational angle and radial distance from center of the disk.

The market for data storage devices trends towards increasing data storage capacity without associated increases in cost, size, etc. For disk drives, one way to meet these demands is to increase the areal density of the recording media. Generally, this means storing more bits per unit of area on the magnetic disks. This generally results in a comparative reduction in track width and/or spacing for hard disk media, because more tracks are recorded onto a disk that has not increased in diameter.

One side-effect of smaller track width/spacing is an increased chance of errors during reading of the tracks, such as when a read/write head is not centered over the track when reading. The head may be off-center of the written track for a number of reasons, e.g., servo errors when writing and/or reading the data, misalignment of read and/or write transducers due to thermal effects, effects of skew angle, etc. The detected magnetic signals from off-center-tracking may not be sufficiently strong enough to decode. An off-center head may also pick up increased interference from adjacent tracks, further reducing the ability to decode data.

Generally, when there is a read error, the drive controller may command the read/write head to retry reading of at least part of the track. This retry may occur at a slight offset from the previous read in case the error was due to off-center tracking during the original read. As will be described in greater detail below, even multiple ones of these retries may fail to recover all the data in a portion of the track. This type of failure may become more prevalent as hard disk areal density increases. The embodiments described below include functionality to detect and correct these errors.

Figure 1:
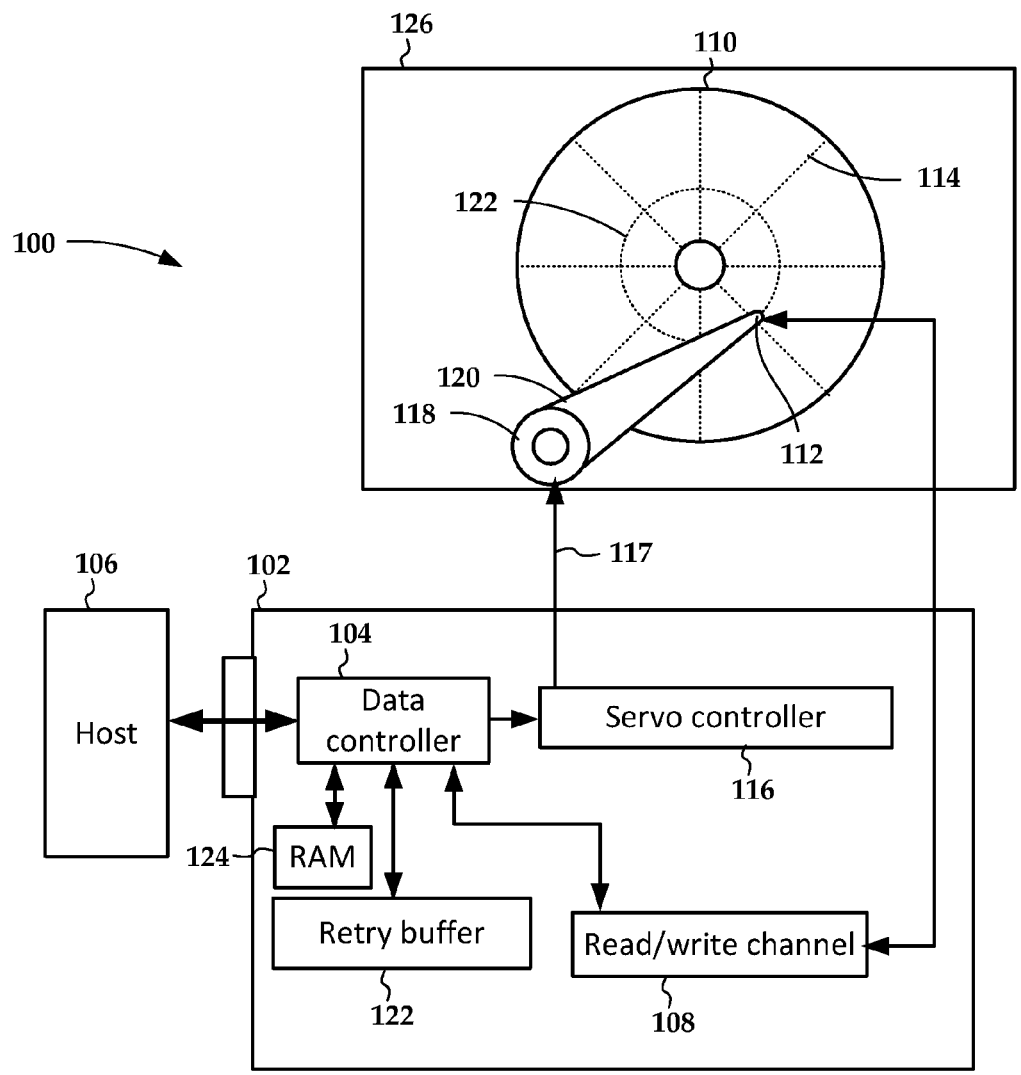
FIG. 1 is a block diagram of an apparatus and system according to an example embodiment.

In FIG. 1, a block diagram illustrates a control logic circuit 102 of a hard disk drive 100 according to an example embodiment. The circuitry 102 includes a data controller 104 that processes read and write commands and associated data from a host device 106. The host device 106 may include any electronic device that can be communicatively coupled to store and retrieve data from a data storage device, e.g., a general-purpose computer. The data controller 104 is coupled to a read/write channel 108 that reads from and writes to a surface of a magnetic disk 110 via one or more read/write heads 112.

During read operations, the read/write channel 108 generally converts analog signals from the read/write heads 112 to digital signals processed by the data controller 104. To facilitate the read operations, the read/write channel 108 may include analog and digital circuitry such as preamplifiers, filters, decoders, digital-to-analog converters, timing-correction units, etc. The read/write channel 108 also provides servo data read from servo wedges 114 on the magnetic disk 110 to a servo controller 116. The servo controller 116 uses these signals to provide a voice coil motor control signal 117 to a VCM 118. The VCM 118 rotates an arm 120 upon which the read/write heads 112 are mounted in response to the voice coil motor control signal 117. Other actuators (not shown) may be used for fine positioning, such as a microactuator mounted on the arm 120 near the read/write heads 112.

Data within the servo wedges 114 is used to detect the location of a read/write head 112 relative to the magnetic disk 110. The servo controller 116 uses servo data to move a read/write head 112 to an addressed track 122 and block on the magnetic disk 110 in response to seek commands. While data is being written to and/or read from the disk 110, the servo data is also used to maintain the read/write head 112 aligned with the track 122. If one of the read or write transducer is not closely aligned with the track center when reading or writing, then track misregistration errors may occur, even if the other transducer was properly aligned during reading or writing.

Generally, the data in the tracks is divided into data sectors, each data sector representing the smallest amount of individually addressable data block. For example, some drives may use a legacy sector size of 512 bytes, although the current trend is toward larger sectors, e.g., 4096 bytes. The data sectors may be read and decoded as a single unit, e.g., with data and error correction codes self-contained in the sector. If a significant portion of the data sector cannot be read due to track misregistration, then the read for the whole sector may fail. In such a case, the read/write channel 108 may command the controller to retry the read, e.g., at the same or different offset relative to a track center defined by the servo system.

Figure 2:
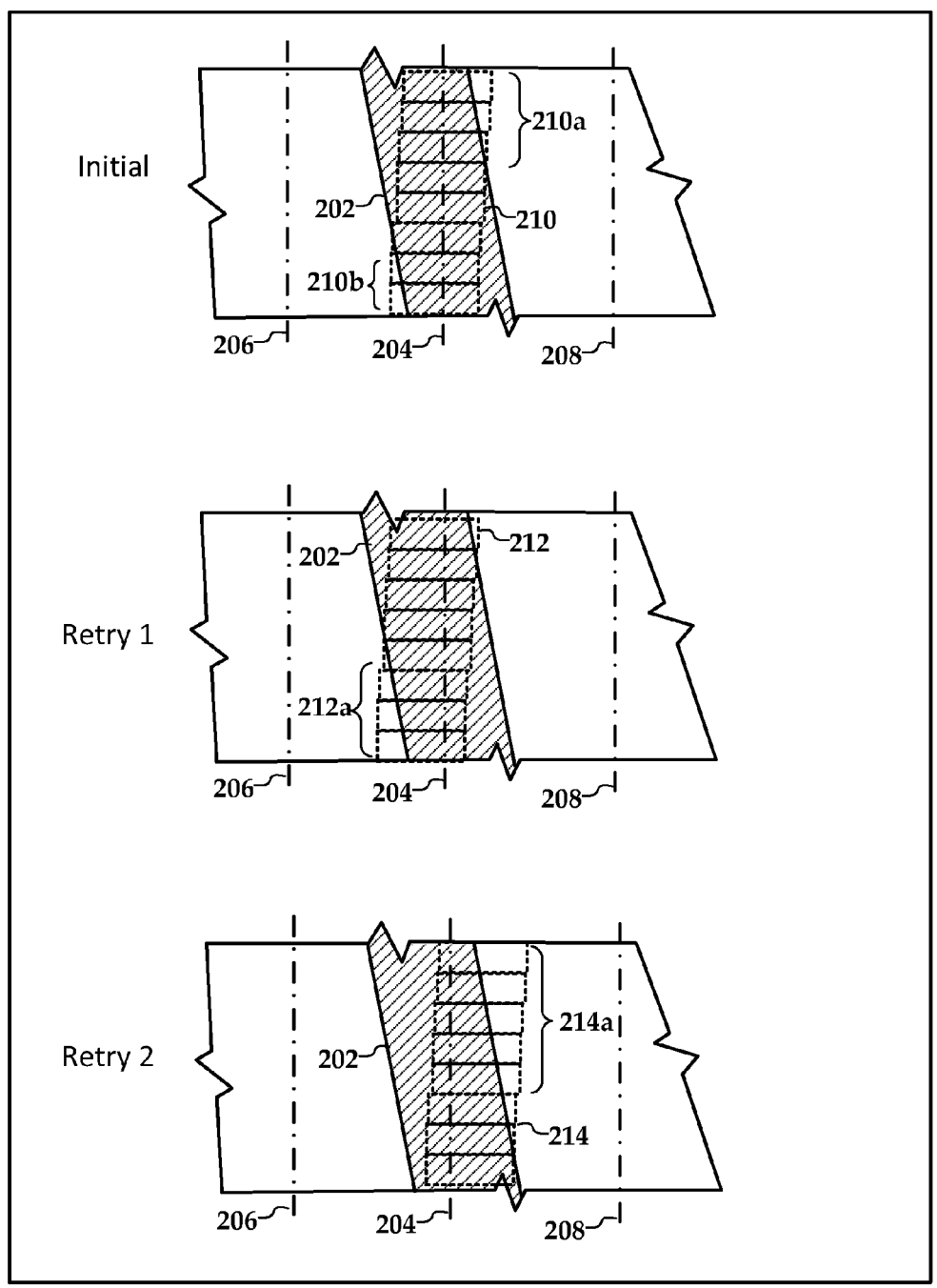
FIG. 2. a block diagram of using sector retry data according to an example embodiment

As earlier mentioned, even multiple retries at different servo offsets may fail to recover a data sector. In view of this, an operational component 122, here annotated as a retry buffer, collects data from multiple retry attempts (as well as the original attempt) and can collectively recover data that might otherwise be unrecoverable by looking at each attempt alone. The retry buffer component 122 may maintain at least two data buffers each capable of storing at least one full sector data. These two buffers, a results buffer and a temporary buffer, may be allocated in system random access memory (RAM) 124 and are described in greater detail below, e.g., in the description of FIG. 5. The retry buffer component 122 may also maintain a metadata buffer in RAM 124 also as described below. In FIG. 2, a block diagram illustrates an example of using data from retries according to an example embodiment.

In FIG. 2, a data sector 202 is written on a recording medium on a track. Line 204 represents a theoretical centerline of the track (e.g., as defined by the servo system), and lines 206 and 208 represent similar centerlines of adjacent tracks. Outline 210 represents the path that a read transducer takes while attempting to read the data sector 202 in an initial attempt (top diagram). Each of the blocks within the outline 210 represents a portion of the sector data, e.g., S/8 bits, where S is the total number of bits in the sector 202.

Note that both the data sector 202 and read outline 210 are misaligned relative to the track centerline 204. As indicated by region 210a, some of the bits may not be readable due to, e.g., low signal strength, adjacent track interference, etc. This may also be true of region 210b. The decoder will have facilities to recover some lost data, but if the data cannot be recovered, retries may be attempted, as indicated by outlines 212 and 214 (middle and bottom diagrams). As indicated by regions 212a and 214a, there still may be sufficient errors such that these retries may also to fail to read the data sector. Using a conventional recovery scheme, the sector may be marked as bad and not used when this occurs. If there was not a backup copy of the data stored at the sector, then the data stored in the sector would be lost.

Figure 3:
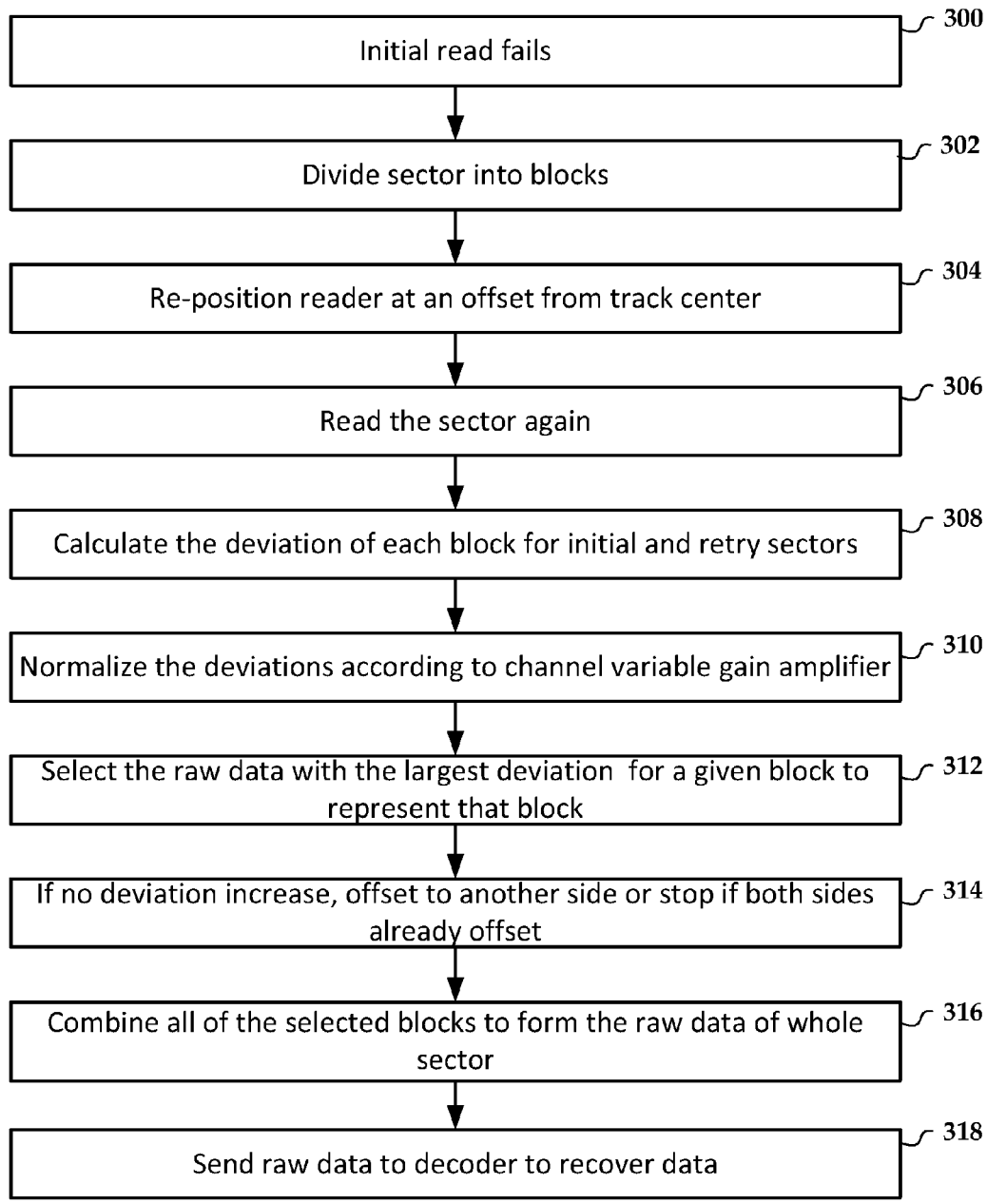
FIG. 3 is a flowchart illustrating a misregistration read recovery scheme according to an example embodiment.

In FIG. 3, a flowchart illustrates a misregistration read recovery scheme according to an example embodiment. After an initial read fails 300, the target sector is divided 302 into n-blocks, for example eight blocks. Fewer blocks may be used, e.g., 2-7 or more blocks may be used, e.g., 9, 10, 11, etc. For purposes of the following discussion, each block will be given an index based on the order the blocks are read, e.g., 0, 1, 2, n−1 for n-blocks. Between two reads of the same sector, blocks having the same index between reads should correspond to the same portion of sector data, and so may be referred to herein as "corresponding blocks." The data from the initial read may be divided into blocks and stored as part of this division 302.

The reader is re-positioned 304 a few servo offsets from track center, and the sector is read again 306 and also divided into blocks. For example, the offset may be about 3% of track pitch, although smaller or larger offsets may be used. Also, servo digital-to-analog to converter (DAC) counts (e.g., integer values of +1, +2, etc.) may be used instead of percentage of track pitch. For the blocks of both the initial and retry data, a deviation s of each block is calculated 308. This deviation may include the standard deviation σ, or a sum as shown below in Equation [1], which is an average of the absolute values of each sample of the signal.

$$s = 1/m \sum_{i=1}^{m} |x_i| \qquad [1]$$

Figures 4, 5:
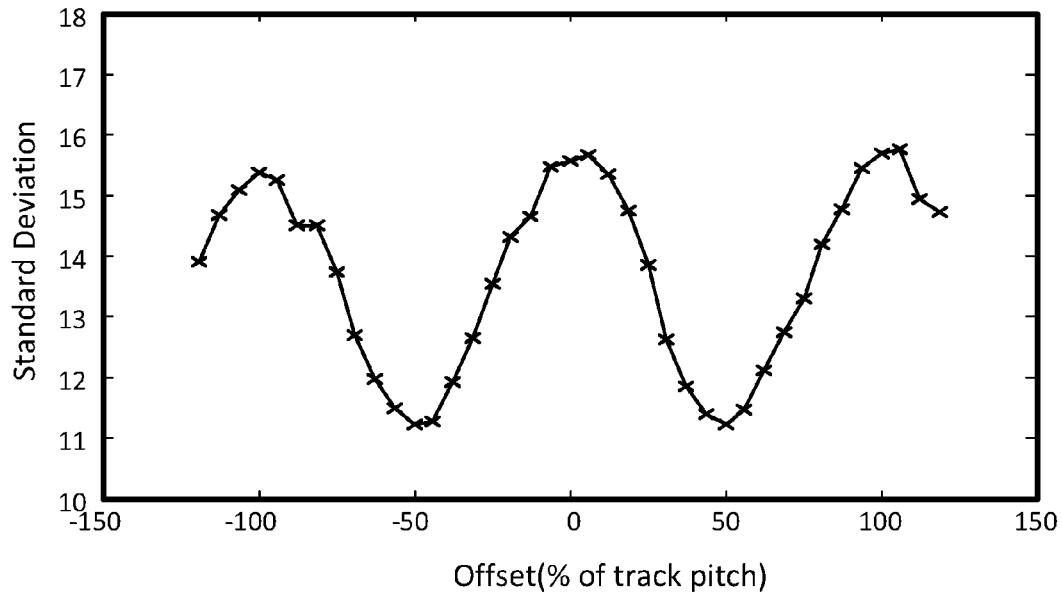
FIG. 4 is a graph showing deviation as a function of servo offset according to an example embodiment.
FIG. 5 is a table showing an example of a recovery operation according to an example embodiment.

Generally, the value of s will be highest for blocks that are centered over the track, as indicated by the graph of FIG. 4, which shows an example of measured standard deviation as a function of offset for a disk drive. The deviation value is normalized 310 according to channel variable gain amplifier (VGA) setting. Generally, a VGA applies a variable amount of gain to the reader signal to compensate for fluctuations of peak-to-peak signal level. This amplification helps in the decoding process, but will skew the value of the deviations as calculated above, and so effects of the VGA will be removed by the normalization 310.

For each block at a particular index, the raw data with the largest s for a given index will be selected 312 represent that index. If the value of s did not increase for at least one block (or did not meet some other threshold), then one more additional reads may be retried 314, e.g., using an offset on the other side of the track center. There may be some limit placed on the number of retries 314, or retries stopped if offsetting on both sides of the track center yields no improvement. Assuming an overall increase in s was obtained, all of the selected blocks are combined 316 to form the raw data of the whole sector. Thereafter, the combined signal can be sent 318 to the decoder to finish recovery of the data.

In FIG. 5, a table shows an example of a recovery operation according to an example embodiment. The first column indicates that a sector is divided into eight blocks, and the first row indicates the sector is subjected to eight passes at different offsets, shown as a percentage of track pitch. The passes are performed from the left column to the right column, and each cell in the table with an underlined number indicates that, for that block, the calculated deviation was higher than for the previous pass. The offsets are applied first from center (the initial read) and then with increasingly larger positive offsets from center until no improvement is seen. Next, increasingly larger negative offsets from center are applied until no improvement is seen in this direction. The final column indicates the final composition of the recovery data for this sector, with blocks being used from all of the passes except for the $3^{rd}$ and $8^{th}$. Note that the $3^{rd}$ and $8^{th}$ passes triggered the end of the recovery procedure in this example; in other cases, the procedure may terminate sooner, e.g., based on exceeding a limit, based on a limited number of blocks showing improvement, based on the amount of improvement (e.g., $s_{current} - s_{previous} >$ threshold), etc.

In one embodiment, the procedure shown in FIG. 5 may be implemented with two buffers, both of which are empty at the beginning. The buffers are each allocated sufficient memory to store a full sector of data each, and the blocks of data within the buffers may be individually addressable or otherwise made accessible, e.g., via bit shifting and/or masking the sector data. All sector data blocks from the initial read is stored in the first buffer, which will accumulate the best data, and so will be referred to as the results buffer. The deviation s for each block is also calculated and may also be stored in a third buffer, referred to here as the metadata buffer. The metadata buffer is optional, but will prevent having to recalculate s for each iteration. The metadata buffer is generally allocated sufficient memory to store a single number (e.g., a 32-bit integer) times the number of blocks into which the sector is divided.

The data from the first retry read of the sector (3% offset from track center in this example) is stored in the next buffer, e.g., a temporary buffer. Because blocks 1 and 2 show better results (higher deviation) data from blocks 1 and 2 are copied from the temporary buffer to the results buffer, overwriting the previously stored values there. The values of deviation s calculated for blocks 1 and 2 are also optionally copied to the metadata buffer overwriting the previously stored deviation values for those blocks. This is repeated for each subsequent pass, which may continue until the cross-track offsets include at least one negative non-zero offset and at least one positive non-zero offset, and each of the subsequent passes has at least one instance of block of data being copied from the temporary buffer to the results buffer. Finally, the data in the results buffer is used to perform data decoding.

Figure 6:
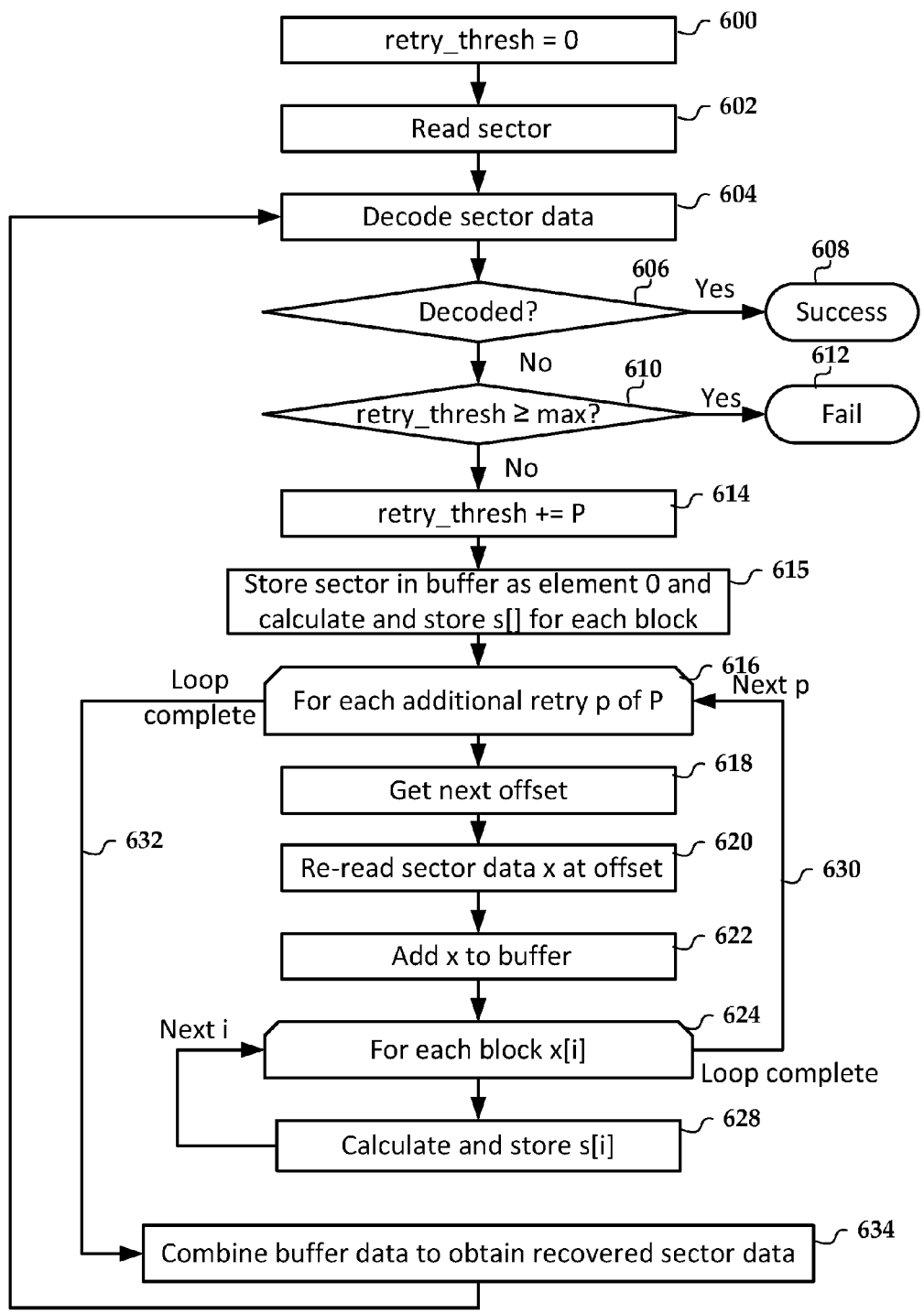
FIGS. 6-8 are flowcharts of methods according to example embodiments.
Figure 7:
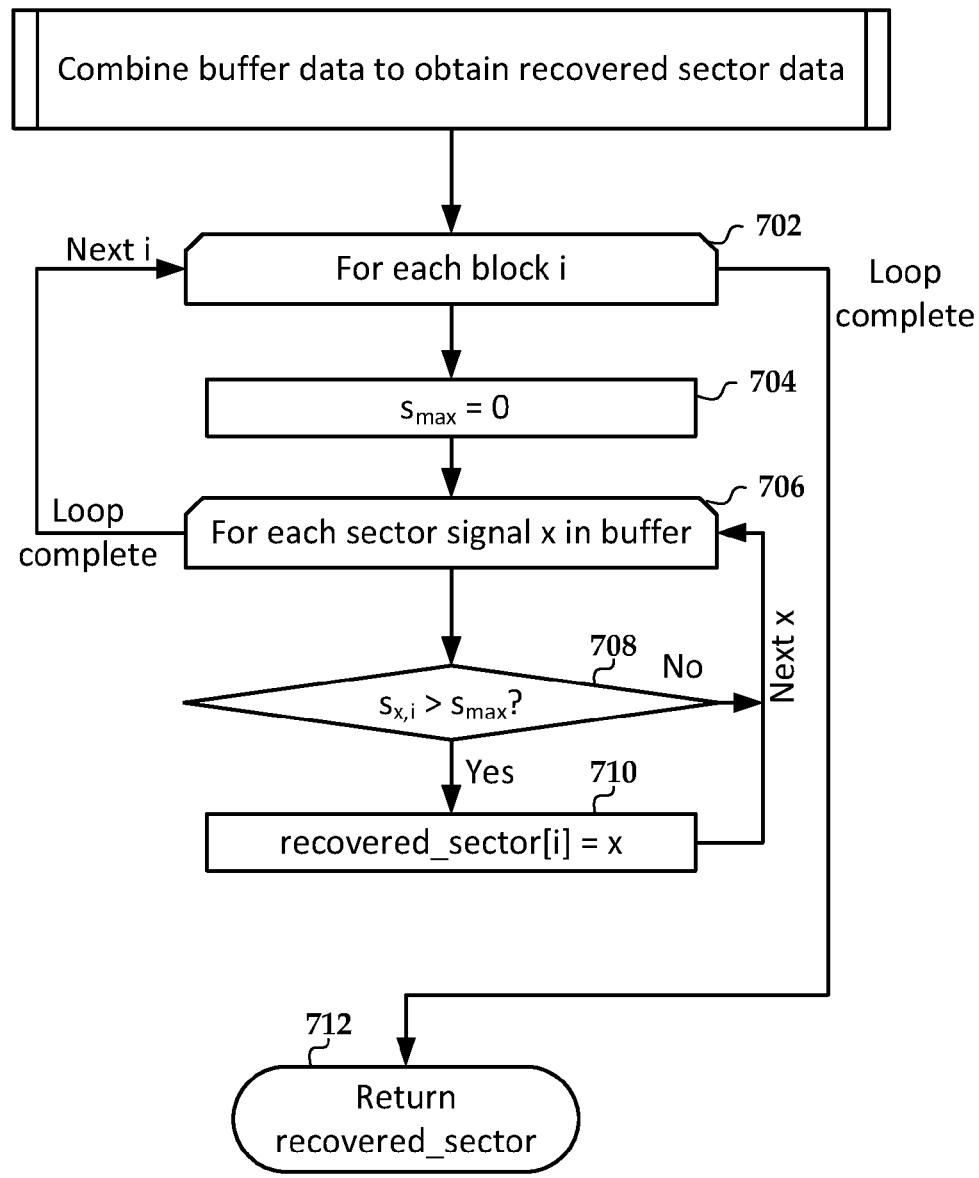

In FIGS. 6 and 7, flowcharts illustrate a method according to an example embodiment, generally relating to recovering sector data. First, in FIG. 6, a retry threshold is initialized 600 and sector data is read 602 and decoded 604. If it is determined 606 that decoding was successful, then the procedure exits 608 with a success condition. Otherwise, the retry threshold is tested 610 and if it is exceeded, the procedure exits 612 with a failure condition. Assuming this is the first retry, the test 610 will return false, and the retry threshold is incremented 614 by an amount P. Generally, it may be more efficient to attempt groups of retries, so P may be set to 2, 3, 4, etc. As will be discussed below, P retries will be performed, during which the sector data is divided into blocks and a deviation for each block is calculated and stored. This is also performed for the originally read block, as indicated at block 615. This block 615 may only be performed once for each sector, however for purposes of clarity, the checks used to ensure block 615 is executed only once are omitted from the flowchart.

Block 616 represents an outer loop that iterates through each of the P retry passes of the sector. A sector offset is determined 618. Generally, it may assumed the original read 602 occurred at zero offset. The next offset can be obtained by, e.g., incrementing a value, selecting the next value in a collection, algorithmically determining the next increment and its direction (e.g., based on previous retry results), etc. In some embodiments, the offset is determined 618 by first selecting a non-zero positive or negative value that is increased until no improvement is seen (e.g., in the function shown in FIG. 6), after which an offset of the opposite sign is selected and incremented. The sector is re-read 620 at the offset and the data from this retry is stored 622 in the buffer. For purposes of this procedure, "storage" may include temporary storage in volatile memory, e.g., dynamic random access memory (DRAM).

An inner loop 624 iterates through each block of the sector data and calculates and stores 628 the deviation value (e.g., standard deviation, average of absolute value of samples) of each block. This calculation 628 may also involve normalization based on VGA gain. Once the inner loop 624 completes (path 630), the next retry is performed via outer loop limit 616. Once the outer loop 616 completes (path 632), buffer data is combined 634 as is described in FIG. 7. The combined data is decoded 604 and the process repeats until either decoding is successful or the retry threshold is exceeded. It should be noted that, unlike the procedure described in relation to FIG. 5, this procedure does not test for improvement between subsequent passes, but uses the decoder to determine whether the sector data has been sufficiently recovered. Those of skill in the art will be able to integrate features from both versions, e.g., to terminate the outer loop 616 early if no improvement is seen between subsequent passes.

In FIG. 7, a flowchart illustrates a procedure for combining the buffer data according to an example embodiment. As indicated by block 702, an outer loop iterates through each block index i. A maximum deviation value is initialized 704 and an inner loop 706 goes through each sector signal in the buffer, which will include at least the original read signal and P-retries, as well as deviation values for each block. The deviation s for the particular block index i and sector signal x are compared 708 to a maximum. If the deviation is greater than the current maximum, corresponding data from the block is copied 710 to the corresponding block in a sector recovery buffer. Upon completion of the loops 702, 706, each block of recovered sector data will have been copied from the sector that has the highest deviation for that block. The recovered sector data will be returned 712 and used as described in FIG. 6.

As noted above, the entry of block 710 indicates that for at least one block, an improvement was seen. If the procedure in FIG. 7 does not enter block 710 (either at all or for the last retry p), then a number of actions may be taken within the procedure. For example, the direction of the offset determined at block 618 in FIG. 6 could be changed to see if an improvement is seen in the other direction. If both offset directions have been tried, the retry threshold tested at block 610 can be set to the maximum value to cause the routine to exit 612 if the data cannot be decoded.

Figure 8:
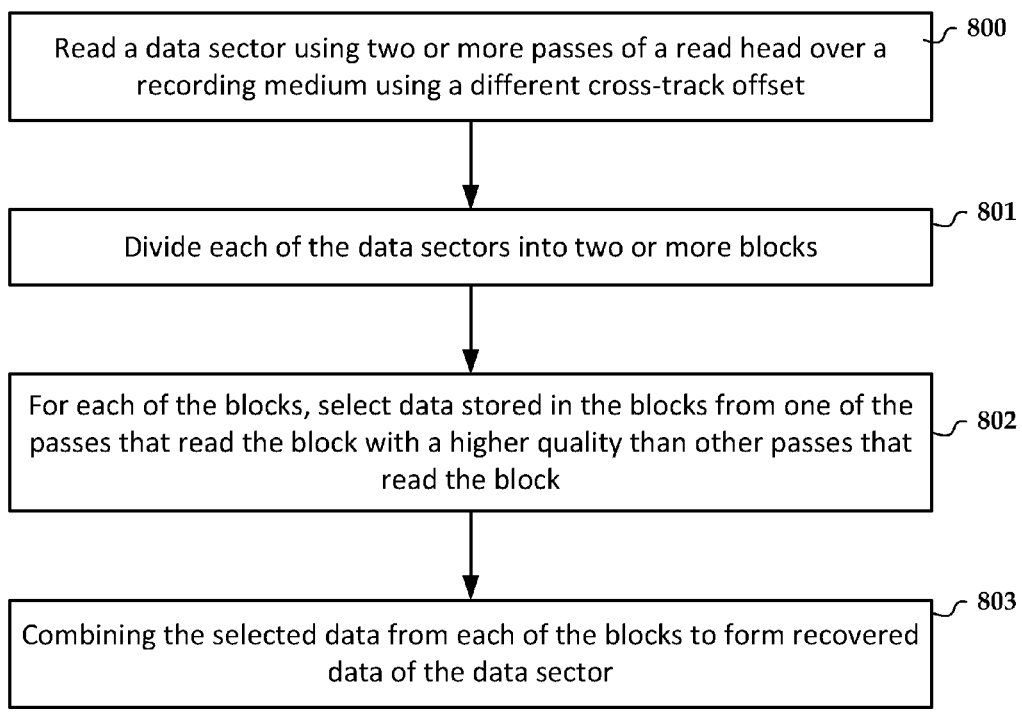

In FIG. 8, a flowchart illustrates a method according to an example embodiment. The method involves reading 800 a data sector using two or more passes of a read head over a recording medium, each of the passes corresponding to a different cross-track offset, each of the data sectors being divided 801 into two or more blocks. For each of the blocks, data stored in the blocks is selected from one of the passes that read the block with a higher quality than other passes that read the block. Selected data from each of the blocks is combined 803 to form recovered data of the data sector.

The embodiments described above may be used with any type of magnetic disk drive. For example, conventional hard disk drives using perpendicular recording may utilize data recovery as described above. This data recovery may be equally relevant for developing magnetic disk drive technologies, such as shingled media recording, heat-assisted magnetic recording, bit patterned media, etc. The recovery may be used in hybrid devices as well, e.g., devices that combine magnetic media with solid-state, non-volatile memory (e.g., flash memory).

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
reading a data sector using two or more passes of a read head over a recording medium, each of the passes corresponding to a different cross-track offset, the data sector being divided into two or more blocks;
for each of the blocks, selecting data from one of the passes that read the block with a higher quality than other passes that read the block; and
combining the selected data to form recovered data of the data sector.

2. The method of claim 1, wherein determining that the passes that read the block with the higher quality than the other passes that read the block comprises comparing a deviation of a signal of each block.

3. The method of claim 2, wherein the deviation comprises a standard deviation of the signal.

4. The method of claim 2, wherein the deviation comprises an average of absolute values of each sample of the signal.

5. The method of claim 2, further comprising normalizing the deviation of each block before comparing the deviations.

6. The method of claim 1, wherein selecting data from one of the passes comprises:
copying the data from an initial pass into a results buffer;
for each subsequent pass of the two or more passes:
copying the data from the subsequent pass into a temporary buffer;
for each of the blocks: comparing first data of the temporary buffer with second data of the results buffer, the first and second data corresponding to the block; and overwriting the second data with the first data if the second data has a higher quality than the first data; and
after completing each subsequent pass, using the results buffer to form the recovered data.

7. The method of claim 6, wherein a deviation value of each block of the initial pass is calculated and stored in a metadata buffer, wherein comparing the first data of the temporary buffer with the second data of the results buffer comprises calculating a second deviation value of the second data and comparing the second deviation value with a corresponding deviation value in the metadata buffer, the corresponding deviation value being overwritten with the second deviation value if the second deviation value is higher.

8. The method of claim 6, wherein the number of passes is based on both:
the different cross-track offsets comprising at least one negative non-zero offset and at least one positive non-zero offset; and
each of the subsequent passes having at least one instance of the second data having a higher quality than the first data.

9. The method of claim 1, wherein the two or more blocks comprises at least eight blocks.

10. The method of claim 1, wherein the track offset comprises 3% of track pitch.

11. The method of claim 1, further comprising sending the recovered data to a decoder that finishes recovery of the data.

12. An apparatus, comprising:
a read channel configured to read data from a recording medium via a read head; and
a controller coupled to the read channel and configured to:
read a data sector using two or more passes of the read head, each of the passes corresponding to a different cross-track offset, the data sector being divided into two or more blocks;
for each of the blocks, select data from one of the passes that read the block with a higher quality than other passes that read the block; and
combine the selected data to form data of the data sector.

13. The apparatus of claim 12, wherein determining that the passes that read the block with the higher quality than the other passes that read the block comprises comparing a deviation of a signal of each block.

14. The apparatus of claim 13, wherein the deviation comprises a standard deviation of the signal.

15. The apparatus of claim 13, wherein the deviation comprises an average of absolute values of each sample of the signal.

16. The apparatus of claim 13, wherein the controller normalizes the deviation of each block before comparing the deviations.

17. The apparatus of claim 12, wherein selecting data from one of the passes comprises:
copying the data from an initial pass into a results buffer;
for each subsequent pass of the two or more passes:
copying the data from the subsequent pass into a temporary buffer;
for each of the blocks: comparing first data of the temporary buffer with second data of the results buffer, the first and second data corresponding to the block; and overwriting the second data with the first data if the second data has a higher quality than the first data; and
after completing each subsequent pass, using the results buffer to form the recovered data.

18. The apparatus of claim 17, wherein a deviation value of each block of the initial pass is calculated and stored in a metadata buffer, wherein comparing the first data of the temporary buffer with the second data of the results buffer comprises calculating a second deviation value of the second data and comparing the second deviation value with the corresponding deviation value in the metadata buffer, the corresponding deviation value being overwritten with the second deviation value if the second deviation value is higher.

19. The apparatus of claim 17, wherein the number of passes is based on both:
the different cross-track offsets comprising at least one negative non-zero offset and at least one positive non-zero offset; and
each of the subsequent passes having at least one instance of the second data having a higher quality than the first data.

20. The apparatus of claim 12, further comprising a decoder coupled to the controller, the recovered data being sent to the decoder to finish recovery of the data.

* * * * *